Apr. 3, 1923.
G. A. N. WAHLEN
1,450,877
ATTACHMENT FOR RAKES
Filed May 7, 1920
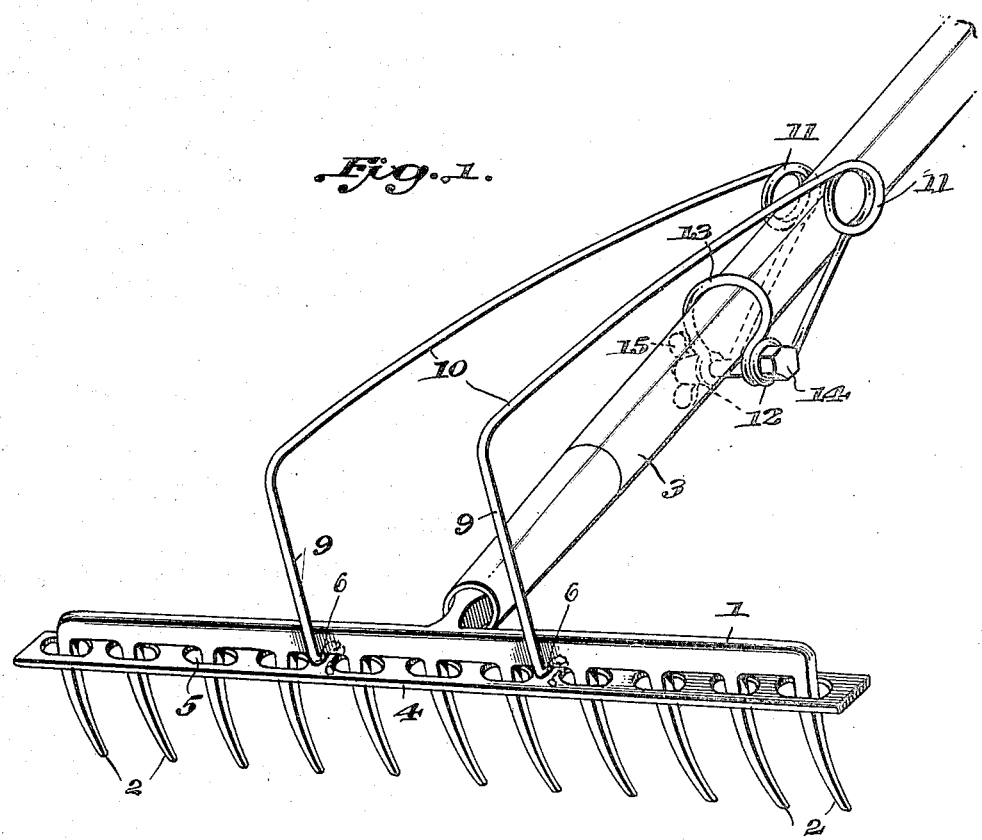
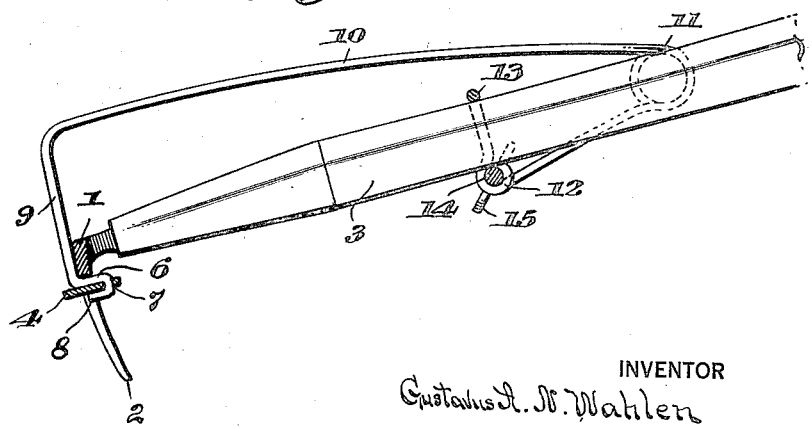
INVENTOR
Gustavus A. N. Wahlen
BY
ATTORNEYS Patented Apr. 3, 1923.

1,450,877

UNITED STATES PATENT OFFICE.

GUSTAVUS A. N. WAHLEN, OF LOUISVILLE, KENTUCKY.

ATTACHMENT FOR RAKES.

Application filed May 7, 1920. Serial No. 379,550.

*To all whom it may concern:*

Be it known that I, GUSTAVUS A. N. WAHLEN, a citizen of the United States of America, residing at Louisville, in the county of Jefferson, and State of Kentucky, have invented certain new and useful Improvements in Attachments for Rakes, of which the following is a specification, reference being had therein to the accompanying drawings.

This invention relates to devices for removing the accumulation of leaves and grass from the tines or teeth of a rake and more particularly to a device of this character including a bar having openings to receive the rake teeth, together with means for yieldingly supporting and moving the bar upon the teeth.

The object of the invention is to provide a very simple device which may be cheaply manufactured and may be applied to any lawn rake of the usual construction without the necessity for changing the construction of rake or the use of tools in applying the device to the rake. A further object of the invention is to provide a spring support for the cleaning bar which support may be quickly attached by a single bolt to any rake handle and is formed from a single continuous piece of wire. It is also an object of the invention to provide certain other new and useful features in the construction and arrangement of parts all as hereinafter more fully described.

With the above and other ends in view, the invention consists in the matters hereinafter set forth and more particularly pointed out in the appended claim, reference being had to the accompanying drawing in which—

Figure 1 is a perspective view of an ordinary lawn rake showing the device, illustrative of the invention, applied thereto, and Fig. 2 is a vertical section through the same.

As shown in the drawing, 1 indicates a rake head of the usual construction provided with a plurality of teeth 2 and 3 indicates the usual rake handle. While a rake of a particular well known type is shown, it will be understood that the invention may be applied as well to any of the well known forms of lawn or garden rake.

The device embodying the invention comprises a bar 4 which is preferably of sheet metal with a plurality of oblong openings 5 punched therein, these openings being of greatest length in the direction of the length of the bar and being adapted to receive the teeth or tines 2 of the rake. The elongation of the openings 5 provides for the application of the bar to the rakes having teeth which are spaced different distances apart, thus making the bar applicable to use in connection with different kinds and constructions of rakes.

To support the cleaning bar 4 in position upon the rake tines and normally adjacent the head 1 or bar connecting the teeth, a spring support is formed from a single continuous piece of wire, the ends of the wire being secured to the cleaning bar 4 at separate points, one at each side of the point of attachment of the handle to the rake head. The ends of the wire are secured to the bar by bending the wire at right angles to form an arm 6 adapted to lie upon the upper surface of the bar and then again bending the wire and extending it through a hole 7 in the bar, the end portion of the wire being bent against the lower side of the bar to form a locking end portion 8 which securely holds the end of the wire fastened to the bar. The portion 6 of the wire which lies upon the upper surface of the bar prevents said bar from tilting and holds it substantially at right angles to the length of the teeth so that it may be moved freely up and down along the teeth.

From the cleaning bar the end portions of the wire are extended vertically forming vertical supporting arms 9 and the wire is then bent over the head 1 of the rake and extended longitudinally of the handle 3 forming spring arms 10. The middle portion of the wire connecting the two spring arms 10 is turned into two parallel spring coils 11, one coil lying at each side of the rake handle and the wire then extended toward the rake head and turned into two parallel eyes 12 with a loop portion 13 connecting the eyes to embrace the handle. A bolt 14 is inserted through the eyes 12 beneath the handle and the loop portion 13 is firmly clamped along the handle by providing a thumb nut 15 on the end of the bolt.

The device is quickly applied to any ordinary rake by slipping the cleaning bar 4 over the tines of the rake head and then engaging the loop 13 with the handle and clamping it thereto by means of bolt 14. The coils 11 and spring arms 10 yieldingly support the cleaning bar in position upon the rake tines adjacent the head or bar of the rake and the vertical arms 9 are preferably as shown in Fig. 2, of such a length that when the spring arms 10 are depressed into engagement with the rake head, the cleaning bar will be lowered to near the lower ends of the teeth but not far enough to be disengaged from the teeth.

The particular manner in which the ends of the wire are bent to attach them to the cleaning bar securely holds the bar without the necessity of riveting or brazing the wire to the bar and if it is found desirable to adjust the device to the rake so that the bar will not move downwardly upon the tines far enough to be disengaged therefrom, the ends of the wire may be rebent to shorten the arms 9. Further, the device may be sold in a knock-down, that is, with the cleaning bar detached from the spring support and the attachment made by any unskilled person when the device is applied to a rake.

Obviously changes may be made in the construction and size and proportion of parts within the scope of the appended claim without departing from the spirit of the invention and I do not therefore limit myself to the particular arrangement shown.

What I claim is:—

An attachment for rakes comprising a bar formed with a plurality of openings elongated longitudinally of the bar and adapted to receive rake tines, and a spring support for the bar comprising a single continuous wire bent to form spring arms with coils at one end of said arms, and the intermediate portion of the wire between the coils bent to form a loop to embrace a rake handle with eyes at the ends of the loops to receive a bolt for clamping the loop about the handle.

In testimony whereof I affix my signature in the presence of two witnesses.

GUSTAVUS A. N. WAHLEN.

Witnesses:
THOMAS J. O'BRIEN,
O. M. WINBORN.